(12) United States Patent
Schaefer

(10) Patent No.: US 10,444,362 B2
(45) Date of Patent: Oct. 15, 2019

(54) LADAR DATA UPSAMPLING

(71) Applicant: RAYTHEON COMPANY, Waltham, MA (US)

(72) Inventor: Matthew A. Schaefer, Rowlett, TX (US)

(73) Assignee: Raytheon Company, Waltham, MA (US)

( * ) Notice: Subject to any disclaimer, the term of this patent is extended or adjusted under 35 U.S.C. 154(b) by 1190 days.

(21) Appl. No.: 14/595,631

(22) Filed: Jan. 13, 2015

(65) Prior Publication Data

US 2019/0227172 A1    Jul. 25, 2019

Related U.S. Application Data

(60) Provisional application No. 61/927,333, filed on Jan. 14, 2014.

(51) Int. Cl.
*G01S 17/89* (2006.01)
*G06T 7/30* (2017.01)
*G06T 5/50* (2006.01)

(52) U.S. Cl.
CPC .............. *G01S 17/89* (2013.01); *G06T 5/50* (2013.01); *G06T 7/30* (2017.01); *G06T 2207/10028* (2013.01)

(58) Field of Classification Search
CPC ... G01S 17/89; G06T 5/50; G06T 7/30; G06T 2207/10028
USPC ........................................................ 382/100
See application file for complete search history.

(56) References Cited

U.S. PATENT DOCUMENTS

| 6,757,445 B1* | 6/2004 | Knopp ................... G01C 11/06 382/154 |
| 9,269,145 B2 | 2/2016 | Ely et al. |
| 2007/0211077 A1* | 9/2007 | Voribiov ............... G06T 3/4007 345/606 |
| 2008/0131029 A1* | 6/2008 | Coleby ................. G01C 11/00 382/300 |
| 2009/0161944 A1* | 6/2009 | Lau ..................... G06K 9/00637 382/154 |

(Continued)

FOREIGN PATENT DOCUMENTS

| CN | 102645209 | * | 8/2012 |
| CN | 103093466 | * | 5/2013 |
| CN | 103700142 | * | 4/2014 |

OTHER PUBLICATIONS

Machine translation for CN 102645209 (Year: 2012).*
Machine translation for CN 103700142 (Year: 2014).*
Machine translation for CN 103093466 (Year: 2013).*

*Primary Examiner* — Qian Yang
(74) *Attorney, Agent, or Firm* — Burns & Levinson, LLP; Joseph M. Maraia

(57) ABSTRACT

Systems and processes for increasing the effective sampling density of a LADAR data set are disclosed. LADAR data points are merged with data regarding edges of objects within the physical space represented by the LADAR data points to form a merged LADAR-edge point cloud. Each data point within the merged LADAR-edge point cloud is examined to identify co-planar neighboring data points within a defined search area. Additional data points are added to the LADAR-edge point cloud by interpolating between the identified, co-planar neighboring data points.

21 Claims, 11 Drawing Sheets

(56) References Cited

U.S. PATENT DOCUMENTS

2010/0092106 A1* 4/2010 Simon .................. G06T 3/4007
　　　　　　　　　　　　　　　　　　　　　　382/300
2015/0248577 A1* 9/2015 Goodwin ............. G06K 9/0063
　　　　　　　　　　　　　　　　　　　　　　382/103

* cited by examiner

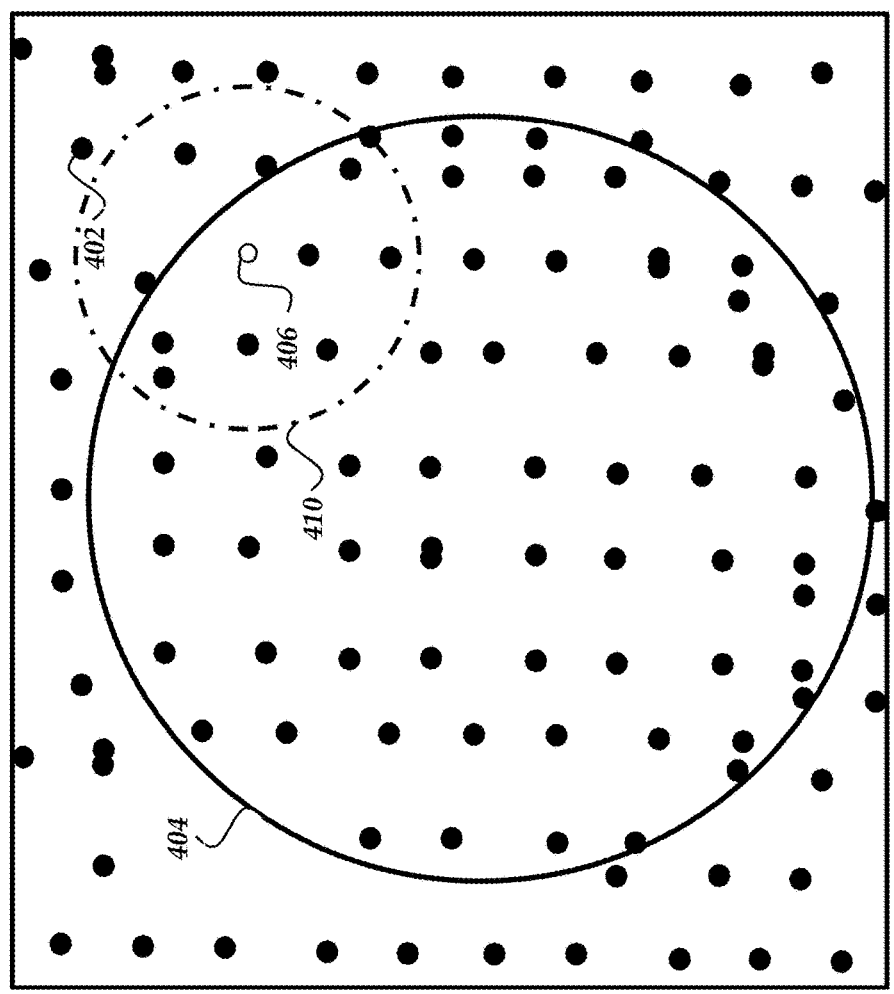

LADAR DATA UPSAMPLING

CROSS-REFERENCE TO RELATED APPLICATION(S)

This application claims the benefit of U.S. Provisional Application No. 61/927,333, filed on Jan. 14, 2014, and entitled, "PAN SHARPENED LADAR," the entirety of which is incorporated by reference.

GOVERNMENT SUPPORT

The invention was supported, in whole or in part, by contract 12-C-0109 awarded by the US Government agency. The Government has certain rights in the invention.

BACKGROUND

LADAR (Laser Detection and Ranging) is a sensing technology that determines distances using a laser light source and a corresponding light detector. For example, to measure the distance between a target and the light source, the light source emits light towards the target and is reflected from a surface of the target. The detector, located at about the location of the light source, measures at least a portion of the reflected light. An analysis of the reflected light measured by the detector provides the distance between the light source and the target surface, as well as the position of the point of reflection.

LADAR may be employed to identify objects within a selected area of interest. For example, the laser light source may be positioned above the area of interest and multiple LADAR measurements are made within the spatial extent of the area of interest. With measurements of horizontal and vertical position of the reflected light, a three-dimensional maps of height as a function of position within the area of interest may be generated. These three-dimensional maps (also referred to as point clouds) may be subsequently interpreted to identify objects within the area of interest based upon their shape.

The three-dimensional point clouds created by LADAR imaging systems can be difficult to interpret, however, due to the granular nature of the LADAR data. Accordingly, there exists an ongoing need for techniques that provide improved interpretability of LADAR data.

SUMMARY

In an embodiment, a system for upsampling LADAR data is provided. The system includes a plurality of electronic data storage devices maintaining a merged LADAR-edge point cloud. The merged LADAR-edge point cloud includes a plurality of LADAR data points, each of the LADAR data points representing a height as a function of position within an area of interest and a plurality of edge data points representing height as a function of position for boundaries of objects within the area of interest. The system further includes one or more processors in communication with the plurality of electronic data storage devices. The one or more processors are adapted to select a first data point from the merged LADAR-edge point cloud, where the first data point includes a first height at a first position, and select a second data point from the merged LADAR-edge point cloud, where the second data point includes a second height at a second position. The second data point is selected such that the second position differs from the first position by less than or equal to a first threshold value and the second height differs from the first height by less than or equal to a second threshold value. The one or more processors are further adapted to generate a plurality of upscaled data points, where each of the plurality of upscaled data points represents a height interpolated between the first height and the second height and a position interpolated between the first position and the second position.

Embodiments of the system may further include one or more of the following, in any combination.

In an embodiment of the system, the one or more processors are further adapted to generate a volume element within a portion of the area of interest, determine a centroid position of all data points of the merged LADAR-edge point cloud and the upscaled data points contained within the volume element, and generate an aggregate LADAR data point representing a height based upon each of the heights of data points contained within the volume element and a position given by the determined centroid position.

In an embodiment of the system, the one or more processors are further adapted to store an upscaled merged LADAR-edge point cloud in the plurality of electronic data storage devices, the upscaled merged LADAR-edge point cloud including the merged LADAR-edge point cloud and the aggregate LADAR data point.

In an embodiment of the system, the upscaled merged LADAR-edge point cloud does not include the plurality of upscaled data points.

In an embodiment of the system, the first threshold value is at least 1.5 times the spacing of adjacent scan lines of the plurality of LADAR data.

In an embodiment of the system, the height of each of the plurality of upscaled data points is given by a linear interpolation between the first height and the second height.

In an embodiment of the system, the position of each of the plurality of upscaled data points is given by a linear interpolation between the first position and the second position.

In an embodiment, a method of upsampling LADAR data is provided. The method includes obtaining, by one or more processors, a merged LADAR-edge point cloud. The merged LADAR-edge point cloud includes a plurality of LADAR data points, where each of the LADAR data points represents a height as a function of position within an area of interest, and a plurality of edge data points representing height as a function of position for boundaries of objects within the area of interest. The method further includes selecting, by the one or more processors, a first data point from the merged LADAR-edge point cloud, the first data point including a first height at a first position, selecting, by the one or more processors, a second data point from the merged LADAR-edge point cloud, the second data point including a second height at a second position. The second data point is selected such that the second position differs from the first position by less than or equal to a first threshold value and the second height differs from the first height by less than or equal to a second threshold value. The method additionally includes generating, by the one or more processors, a plurality of upscaled data points, where each of the plurality of upscaled data points represents a height interpolated between the first height and the second height and a position interpolated between the first position and the second position.

Embodiments of the method may further include one or more of the following, in any combination.

In an embodiment, the method further includes, by the one or more processors, generating a volume element within a portion of the area of interest, determining a centroid position of all of the merged LADAR-edge point cloud and the upscaled data points contained within the volume element, and generating an aggregate LADAR data point representing a height based upon each of the heights of the data points contained within the volume element and a position given by the determined centroid position.

In an embodiment of the method, the one or more processors is further adapted to store an upscaled merged LADAR-edge point cloud in the plurality of electronic data storage devices the upscaled merged LADAR-edge point cloud including the merged LADAR-edge point cloud and the aggregate LADAR data point.

In an embodiment of the method, the upscaled merged LADAR-edge point cloud does not include the plurality of upscaled data points.

In an embodiment of the method, the first threshold value is at least 1.5 times the spacing of adjacent scan lines of the plurality of LADAR data.

In an embodiment of the method, the height of each of the plurality of upscaled data points is given by a linear interpolation between the first height and the second height.

In an embodiment of the method, the position of each of the plurality of upscaled data points is given by a linear interpolation between the first position and the second position.

In an embodiment, a non-transitory, computer-readable medium having computer-readable program codes embedded thereon for upsampling LADAR data is provided. The computer-readable program codes include instructions that, when executed by one or more processors, cause the one or more processors to obtain a merged LADAR-edge point cloud. The merged LADAR-edge point cloud includes a plurality of LADAR data points, each of the LADAR data points representing a height as a function of position within an area of interest and a plurality of edge data points representing height as a function of position for boundaries of objects within the area of interest. The computer-readable program codes further include instructions that, when executed by one or more processors, cause the one or more processors to select a first data point from the merged LADAR-edge point cloud, the first data point representing a first height at a first position and select a second data point from the merged LADAR-edge point cloud, the second data point representing a second height at a second position. The second data point is selected such that the second position differs from the first position by less than or equal to a first threshold value and the second height differs from the first height by less than or equal to a second threshold value. The computer-readable program codes also include instructions that, when executed by one or more processors, cause the one or more processors to generate a second plurality of LADAR data points, where each of the second plurality of LADAR data points represents a height interpolated between the first height and the second height and a position interpolated between the first position and second position.

Embodiments of the computer-readable medium further include one or more of the following, in any combination.

In an embodiment, computer-readable program codes further include instructions that, when executed by one or more processors, cause the one or more processors to generate a volume element within a portion of the area of interest, determine a centroid position of all of the merged LADAR-edge point cloud and the upscaled data points contained within the volume element, and generate an aggregate LADAR data point representing a height based upon each of the heights of the data points contained within the volume element and a position given by the determined centroid position.

In an embodiment, computer-readable program codes further include instructions that, when executed by one or more processors, cause the one or more processors to store an upscaled merged LADAR edge point cloud in the plurality of electronic data storage devices, the upscaled merged LADAR-edge point cloud including the merged LADAR-edge point cloud and the aggregate LADAR data point.

In an embodiment of the computer-readable medium, the upscaled merged LADAR-edge point cloud does not include the plurality of upscaled data points.

In an embodiment of the computer-readable medium, the first threshold spacing is at least 1.5 times the spacing of adjacent scan lines of the plurality of LADAR data.

In an embodiment of the computer-readable medium, the height of each of the plurality of upscaled data points is given by a linear interpolation between the first height and the second height.

In an embodiment of the computer-readable medium, the position of each of the plurality of upscaled data points is given by a linear interpolation between the first position and the second position.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 4B is a schematic illustration of a search radius superimposed upon FIG. 4A;

DETAILED DESCRIPTION

Figure 1:
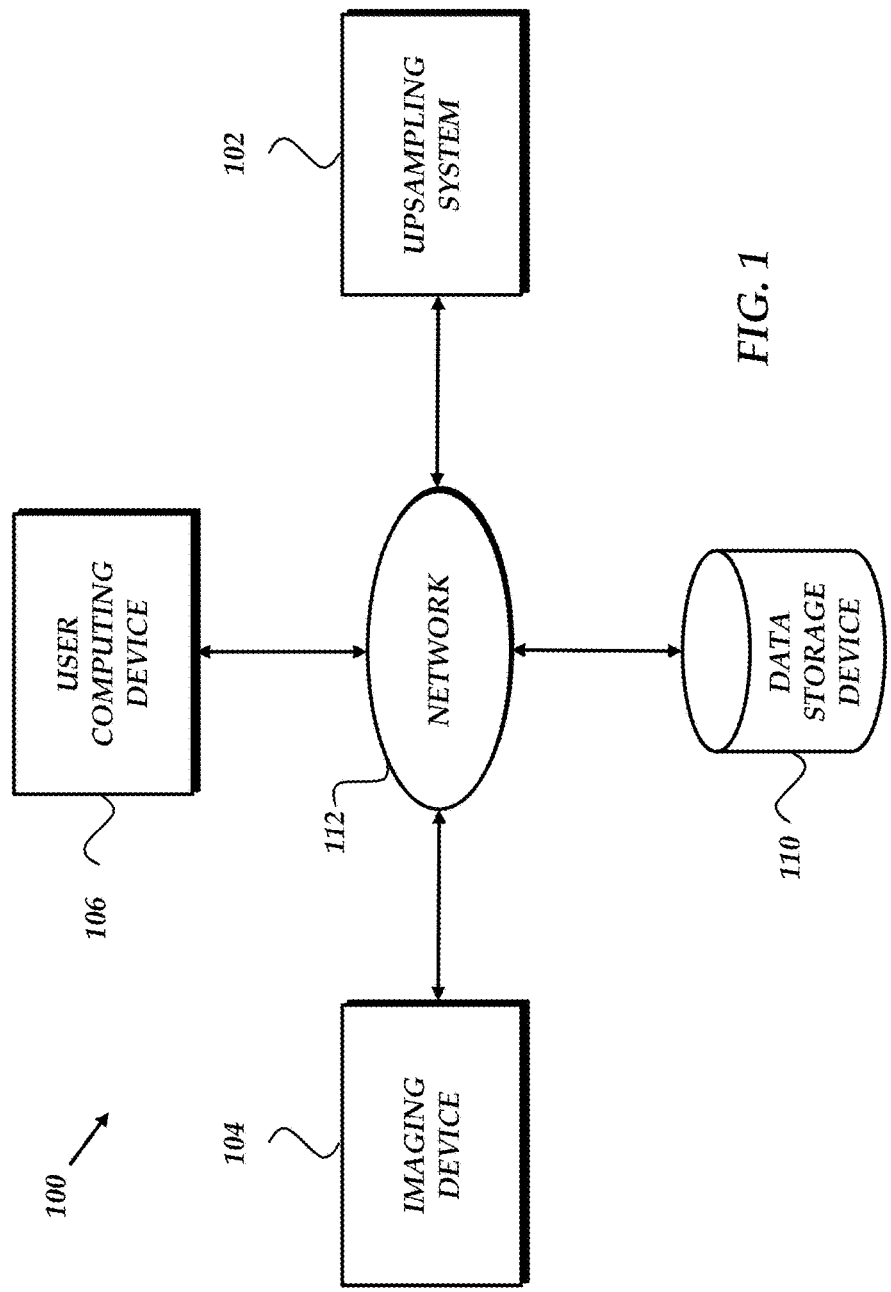
FIG. 1 is a schematic illustration of an operating environment including an upsampling system of embodiments of the present disclosure for use in upsampling LADAR data.

Embodiments of the disclosure discuss processes and corresponding systems for increasing an effective sampling density of LADAR data, referred to herein as upsampling. By upsampling a LADAR data set, images generated from the LADAR data set provide a higher fidelity look at objects within an area of interest and easier interpretability of terrain, objects, and attendant condition. Upscaled LADAR data can further improve determinations of morphology, condition, and identification of objects. It may be understood that, while embodiments of the disclosed systems and processes may be illustrated with reference to upsampling of LADAR data, the disclosed systems and processes may also be employed in combination with other three-dimensional imaging data, such as Passive3D scenes.

In an embodiment of the upsampling process, a computing device receives LADAR data measured within a selected area of interest as well as further receives edge data representing boundaries of surfaces within the selected area of interest. The edge data may be extracted from high resolution imagery of the area of interest (e.g., one or more photographs). The edge data are projected within the LADAR data, mapping edge data points to appropriate locations within the LADAR data. This combined data set will be referred to herein as a merged LADAR-edge point cloud. As the edge data points are relatively dense (i.e., closely spaced) in comparison to the original LADAR data, they will have the appearance of lines in an image of the LADAR-edge point cloud with the less dense LADAR data points filling in the surfaces defined by the edge data points.

The upsampling process subsequently densifies the merged LADAR-edge point cloud to fill in a portion of the empty space between the original LADAR data points. For example, a data point (edge or LADAR) is selected and analyzed to identify other data points that are positioned within a given radius of it. Each of the data points within this radius are further analyzed to determine if it lies within the same plane as the selected data point. Subsequently, additional data points are added along lines extending between the selected data point and each of the other data points identified to be neighboring and co-planar to it. The position and height assigned to each additional data point are given by an interpolation of the position and height of the selected the selected data point and its neighboring, co-planar data point. In certain embodiments, the interpolation may be a linear interpolation. The upsampling process is iterated for each data point within the merged LADAR-edge point cloud until all points have considered. After upsampling is complete, the upscaled LADAR-edge point cloud may be fused with additional imagery to create a dense set of colored points. Such colored points may further promote interpretability.

Beneficially, use of the merged LADAR-edge point cloud, rather than the LADAR point cloud alone, yields upscaled data exhibiting clean, sharp edges. For example, without the edge data, additional data can be interpolated between co-planar LADAR data points to define surfaces. However, the exact boundaries of such surfaces are likely to lie between LADAR data points and yield images having surfaces with poorly defined edges that are difficult to interpret. In contrast, with the edge data, additional data is not only interpolated between co-planar LADAR data points but also between co-planar edge data points and co-planar edge and LADAR data points. The resulting upscaled, merged LADAR-edge point cloud would yield images having surfaces with well defined edges that are much easier to interpret.

Embodiments of the upsampling process also provide further benefits. In one aspect, the upsampling process is capable of filling in missing sections of LADAR data (e.g., on the ground). In another aspect, the upsampling process may be easily parallelized, as upsampling operations may be performed on each data point with no knowledge needed of the other data points.

Beneficially, as discussed in greater detail below, preliminary evaluation of LADAR-edge point clouds upscaled according to embodiments of the disclosed upscaling process exhibit an approximately three-fold increase in resolution, from about 1 point per 0.8 meters to approximately 1 point per 0.25 meters. Subsequent testing of the interpretability of the images derived from the upscaled data found that interpretability increased by an average of about 1 on the National Image Interpretability Rating Scale (NIIRS).

The discussion will now turn to FIG. 1, which illustrates an embodiment of an operating environment 100 for upsampling data, such as LADAR data. The operating environment 100 includes an upsampling system 102, an imaging device 104, a user computing device 106, and a plurality of data storage devices 110 in communication via a network 112.

The imaging device 104, in an embodiment, may be a LADAR device. For example, the imaging device 104 may be mounted to a satellite or aircraft in a downward-facing orientation and adapted to transmit laser light for incidence on surfaces within a region of interest. The imaging device 104 may further include a plurality of sensors for detecting reflected laser light. The reflected laser light may be analyzed by the imaging device 104 or a remote computing device (not shown) in communication with the imaging device 104 to determine respective horizontal and vertical positions of surfaces reflecting each laser beam. Collectively, these positions comprise at least a portion of the LADAR data acquired by the imaging device 104.

Each LADAR datum is represented in a coordinate system. Examples of the coordinate system may include, but are not limited to, latitude, longitude, and attitude, Cartesian coordinates, Euclidean vector space, etc. Upon acquisition, the LADAR data may be transmitted directly to the upsampling system 102 for upsampling operations and/or stored in the data storage devices 110 for later retrieval and use.

The upsampling system 102 may be any computing device having one or more processors. The data storage devices 110 may include one or more electronic data storage devices capable of maintaining computer-readable data. Examples include, but are not limited to, magnetic storage (e.g., magnetic tape, magnetic disks, etc.), optical storage (e.g., CD, DVD, etc.), solid state storage (e.g., flash memory, etc.), and other computer-readable media without limit.

A user may employ his or her user computing device 106 to communicate with the upsampling system 102, the imaging device 104 and/or data storage devices 110 for generating upscaled LADAR data. For example, the user computing device 106 may maintain or generate one or more user interfaces allowing the user to instruct the upsampling system 102 to obtain and/or receive selected LADAR data, edge data, and further parameters for the upsampling process. Upon receipt, upsampling system 102 implements the upsampling process and subsequently stores the output (e.g., in the data storage devices 110).

Figure 2A:
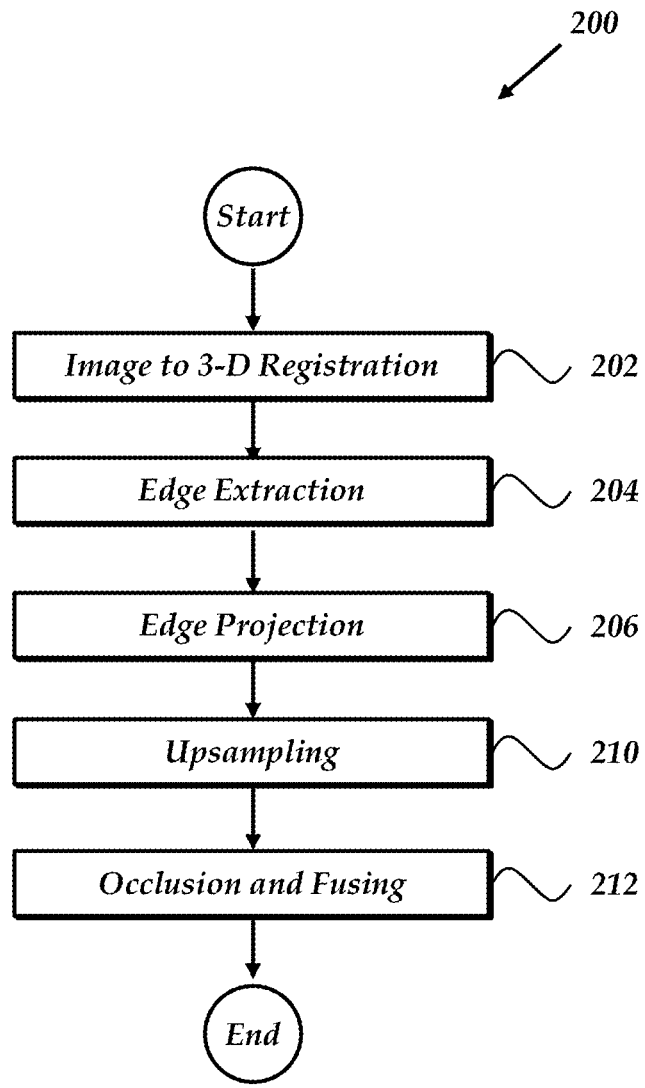
FIGS. 2A-2B are a flow diagrams of an embodiment of an upsampling process of the present disclosure.
Figure 2B:
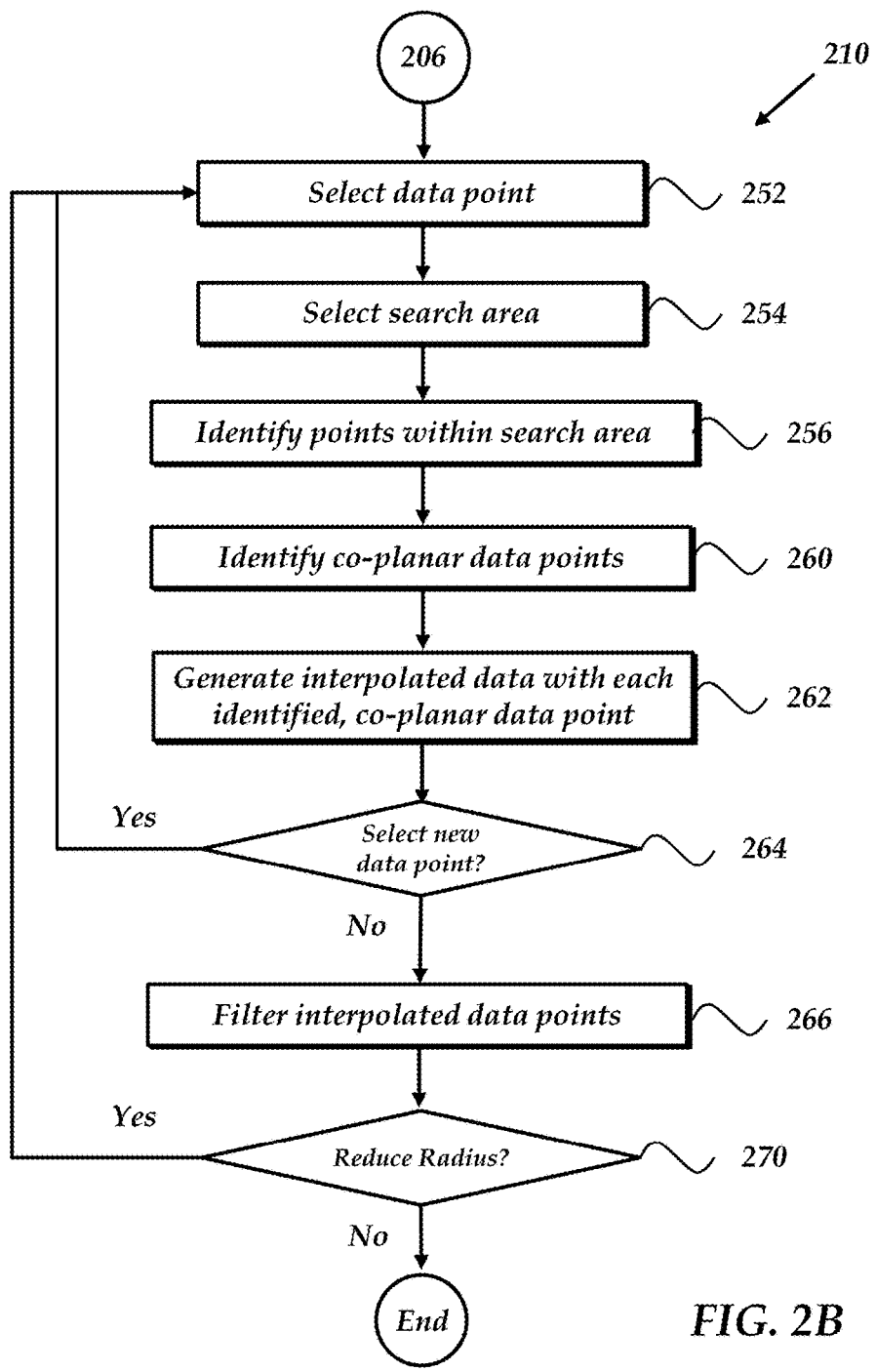

With reference to FIGS. 2A-2B, an embodiment of an upsampling process 200 for upsampling LADAR data is illustrated. The upsampling process 200 includes registration 202, edge extraction 204, edge projection 206, upsampling 210, and occlusion and fusing 212. In certain embodiments, the upsampling system 102 may perform each of the operations of upsampling process 200. In alternative embodiments, the upsampling system may perform only a portion of the operations of upsampling process 200 (e.g., edge projection 206, upsampling 210, etc.), with remaining operations of the upsampling process performed by one or more other computing devices.

Figure 3A:
FIG. 3A is an image representative of a LADAR data acquired for an area of interest.

In operation 202, image to 3-D registration is performed. Detailed discussion of embodiments of this registration is found in U.S. Provisional Application No. 61/717,414, entitled "SYSTEM AND METHOD FOR AUTOMATIC LADAR-EO IMAGE REGISTRATION" and U.S. application Ser. No. 14/059,802, entitled "SYSTEM AND METHOD FOR AUTOMATICALLY REGISTERING AN IMAGE TO A THREE-DIMENSIONAL POINT SET," the entirety of each of which are incorporated by reference. In brief, a LADAR point cloud acquired by the imaging device 104 (FIG. 3A) within an area of interest and corresponding digitized photographic image of the area of interest (FIG. 3B) are obtained (e.g., from data storage devices 110). The obtained LADAR point cloud is transformed into a terrain shaded relief (TSR) image using the terrain within the photographic image and the angle of the sun to create a shadowed landscape, as illustrated in FIG. 3A. A set of tie points between the TSR and the image is further found and the tie points are sent through a bundle adjust to generate a new set of rational polynomial coefficients (RPC) that can be used to map the photographic image line/samples to LADAR UTM points.

Figure 3C:
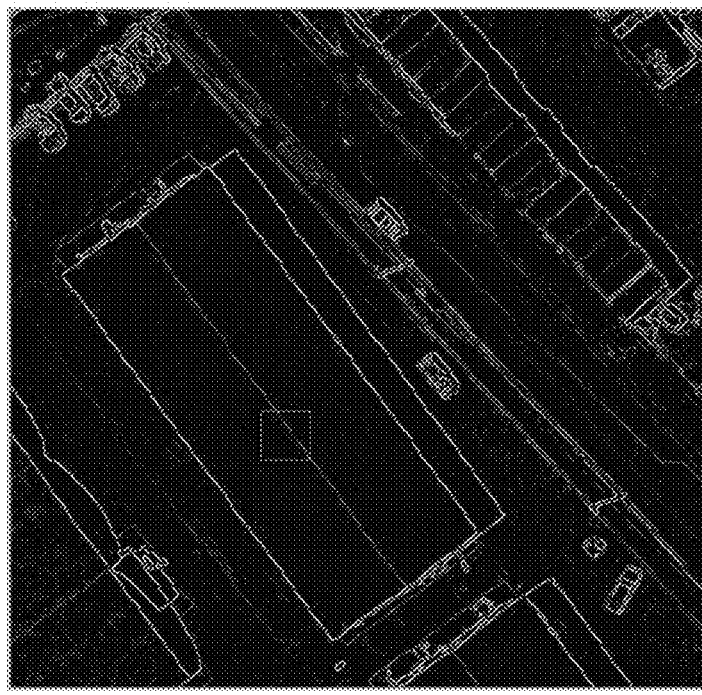
FIG. 3C is an image representative of edge data extracted from the photographic image of FIG. 3B.
Figure 3B:
FIG. 3B is a photograph of the area of interest corresponding to the LADAR data of FIG. 3A.

After registration, edges are extracted from the photographic image using a filter in operation 204. For example, a Canny edge extraction routine may employed, where a Sobel filter and an edge tracking algorithm create a binary mask of edges in the area of interest sampled by the LADAR point cloud. It may be understood, however, that other edge extraction techniques may be employed without limit. Extracted edges are filtered to remove the weak edges by applying a minimum response threshold. The edge mask may be further stored (e.g., within the data storage devices 110) for subsequent use. For example, the edge mask may be stored as a National Imagery Transmission Format (NITF) file, with the RPC coefficients preserved from the original imagery. An example of edge data extracted from the photographic image is illustrated in FIG. 3C.

Figure 3E:
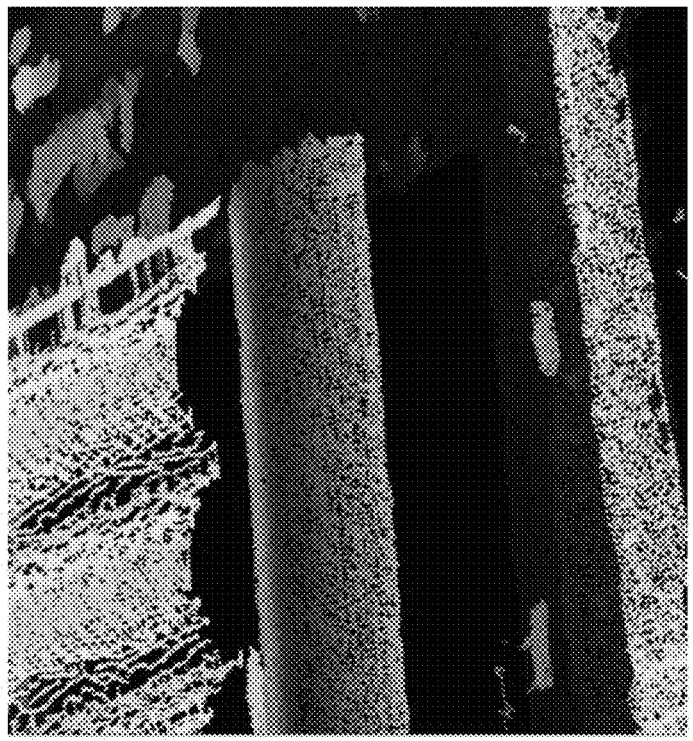
FIG. 3E is an image representative of the merged LADAR-edge point cloud of FIG. 3D after an upsampling process using a search radius.
Figure 3D:
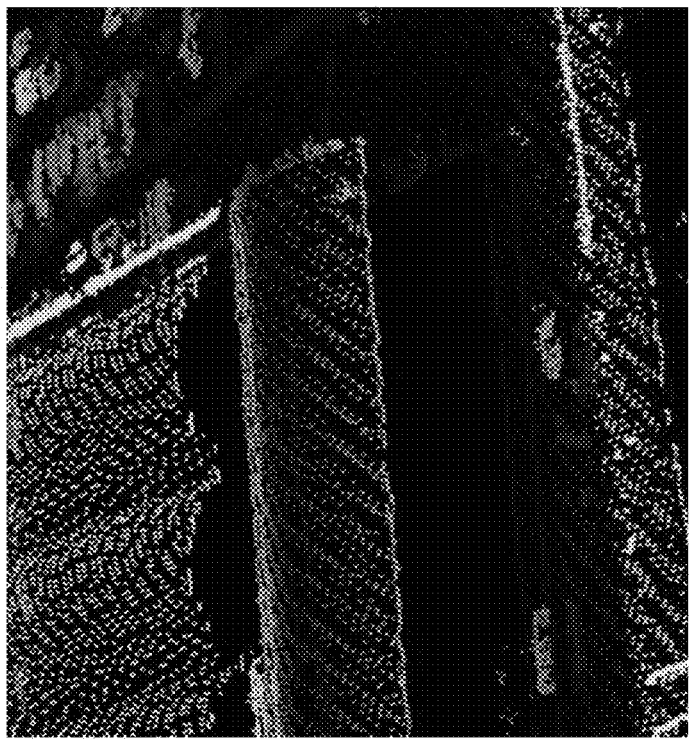
FIG. 3D is an image representative of an embodiment of a merged LADAR-edge point cloud combining the LADAR and edge data of FIGS. 3A and 3C.

In operation 206, the edge data is projected into the registered LADAR point cloud, creating a merged LADAR-edge point cloud, illustrated in FIG. 3D. For each edge point in the edge image, the line/sample may be projected through the RPC to obtain longitude/latitude. The LADAR point cloud is queried for this longitude/latitude, the height is returned, and projection is performed again using this new elevation. This process is iterated until the projected point does not change position by more than a selected amount. Examples of the selected amount may include, but are not limited to, less than or equal to about 10 meters, less than or equal to about 8 meters, less than or equal to about 6 meters, less than or equal to about 4 meters, less than or equal to about 2 meters, less than or equal to about 1 meter, less than or equal to about 0.8 meters, less than or equal to about 0.6 meters, less than or equal to about 0.4 meters, less than or equal to about 0.2 meters, less than or equal to about 0.1 meters, and less than or equal to about 0.05 meters. In certain embodiments, the selected amount is less than or equal to about 0.5 meters. If the point never converges, it is not included in the LADAR point cloud.

After all of the points are projected in the LADAR point cloud, a mask band may be created that separates the edge points from the original LADAR data points. This mask band may be used by the upsampling system 102 to distinguish between the original LADAR data and the edge points.

In operation 210, upsampling is performed by the upsampling system 102. Operation 210 includes sub-operations 252-270, as illustrated in FIG. 2B. Sub-operations 252-270 are further discussed in combination with FIGS. 4A-4D.

Figure 4A:
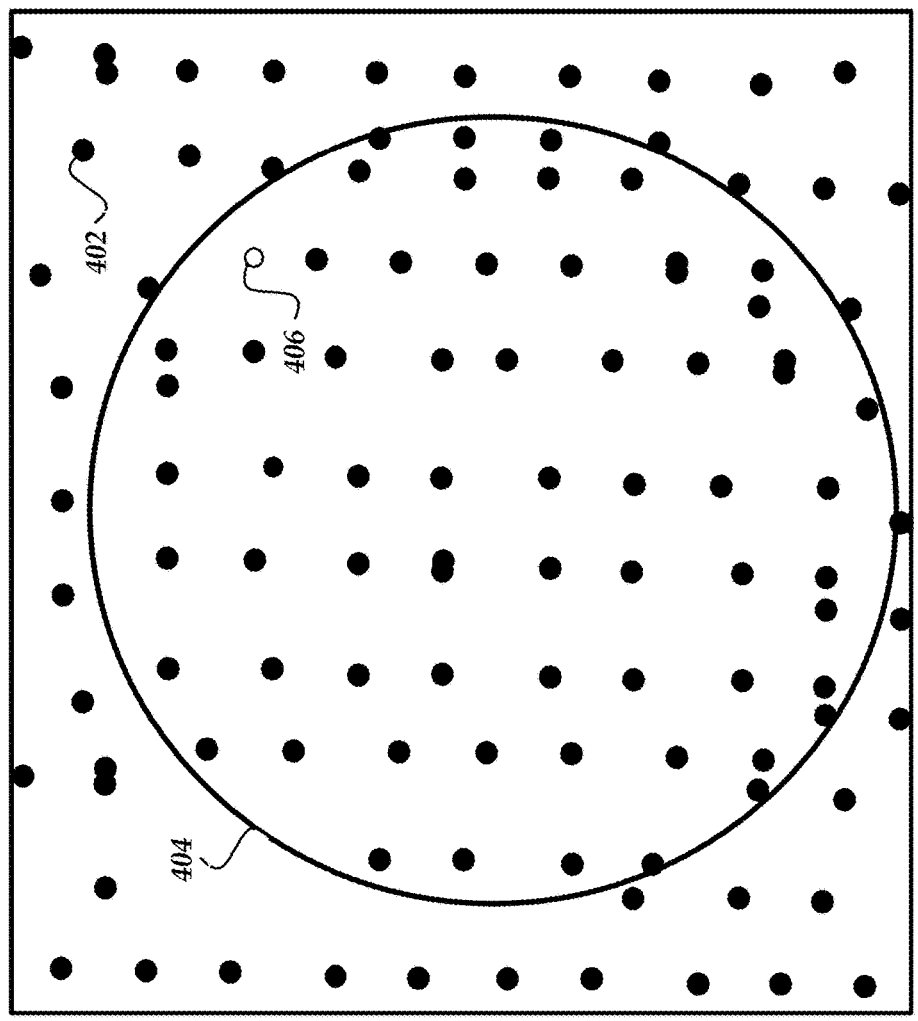
FIG. 4A is a schematic illustration representative of an embodiment of a merged LADAR-edge point cloud.

Referring to FIG. 4A an embodiment of a merged LADAR-edge point cloud including LADAR data 402 and edge data 404, for an area of interest 400 is illustrated. The area of interest 400 includes a water tower, where the edge data 404 outlines an edge of an upper surface of the water tower. While the edge data 404 are discrete points, since their spacing is less than that of the LADAR data, they are illustrated as a solid line in FIGS. 4A-4B for simplicity.

In sub-operation 252, a data point 406 is selected from the merged LADAR-edge point cloud for use in the upscaling process 210. For clarity, the data point 406 is illustrated as an open circle in FIGS. 4A-4D.

In sub-operation 254, a search area 410 is established around the selected point 406. As discussed below, LADAR and edge data points identified within the search area 410 are possible candidates for generating additional interpolated data points in conjunction with the selected data point 406. For clarity of discussion, the search area 410 will be discussed as a closed circle of radius r that is centered on the selected data point 406. However, it may be understood that the search area may be any closed-sided shape.

The search radius may be selected by the user, the upsampling system 102, or combinations thereof. In certain embodiments, the search area 410 may be selected to be large enough such that at least one other LADAR data point is contained within the search area 410. This criterion ensures that at least one other LADAR data point is considered for interpolation with the selected data point 406. In other embodiments, the search area 410 may be selected to be small enough to omit data points that are spaced too far from the data point under consideration. This criterion avoids selection of a search area that is too large, which can lead to generation of upscaled LADAR data that merges closely packed objects (e.g., buildings) and awkwardly fills natural areas.

In further embodiments, the search radius may be selected based upon the dimensions of a pattern formed by the LADAR point cloud 402. For example, the search radius may be selected to be at least 1.5 times the spacing of adjacent scan lines of the LADAR point cloud 402. In this manner, the radius defines a circular search area that encompasses at least a portion of its neighbors plus at least a portion of diagonal points along building edges. Examples of the search radius may include, but are not limited to, less than or equal to about 1 meter, less than or equal to about 0.8 meters, less than or equal to about 0.6 meters, less than or equal to about 0.4 meters, less than or equal to about 0.2 meters, less than or equal to about 0.1 meters, less than or equal to about 0.05 meters.

Figure 4C:
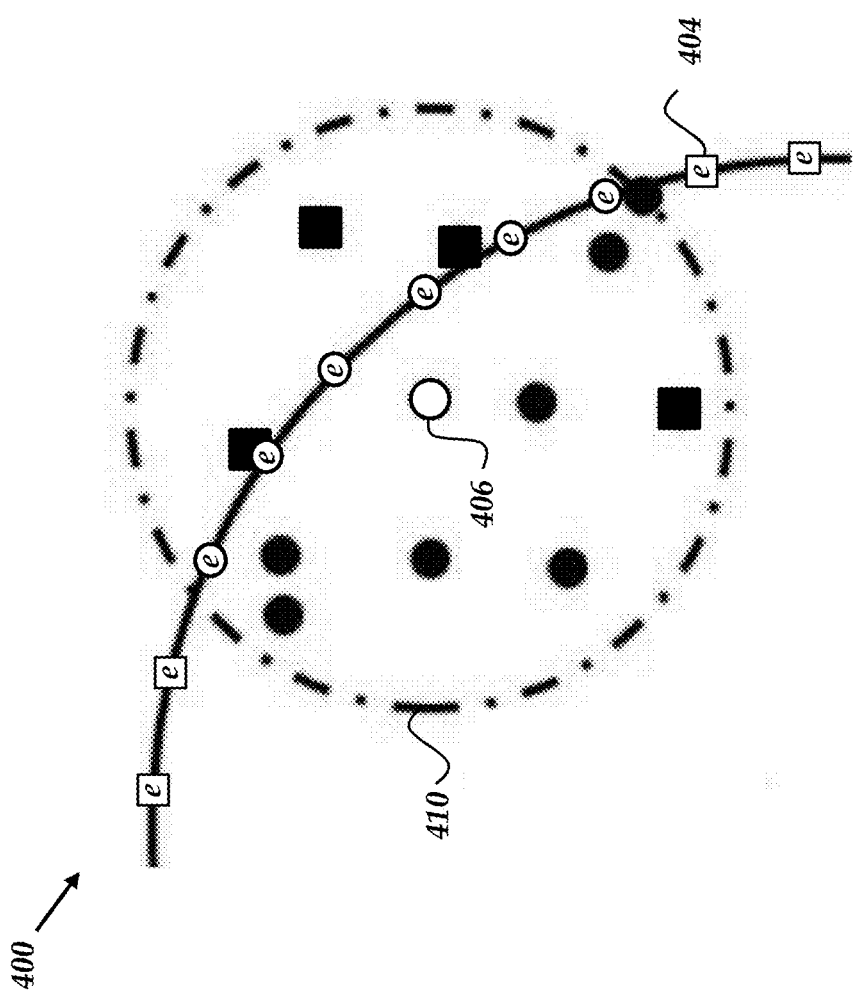
FIG. 4C is a schematic illustration of an enlarged portion of FIG. 4B in an expanded view denoting data points lying in and out of plane with a selected data point.
Figure 4D:
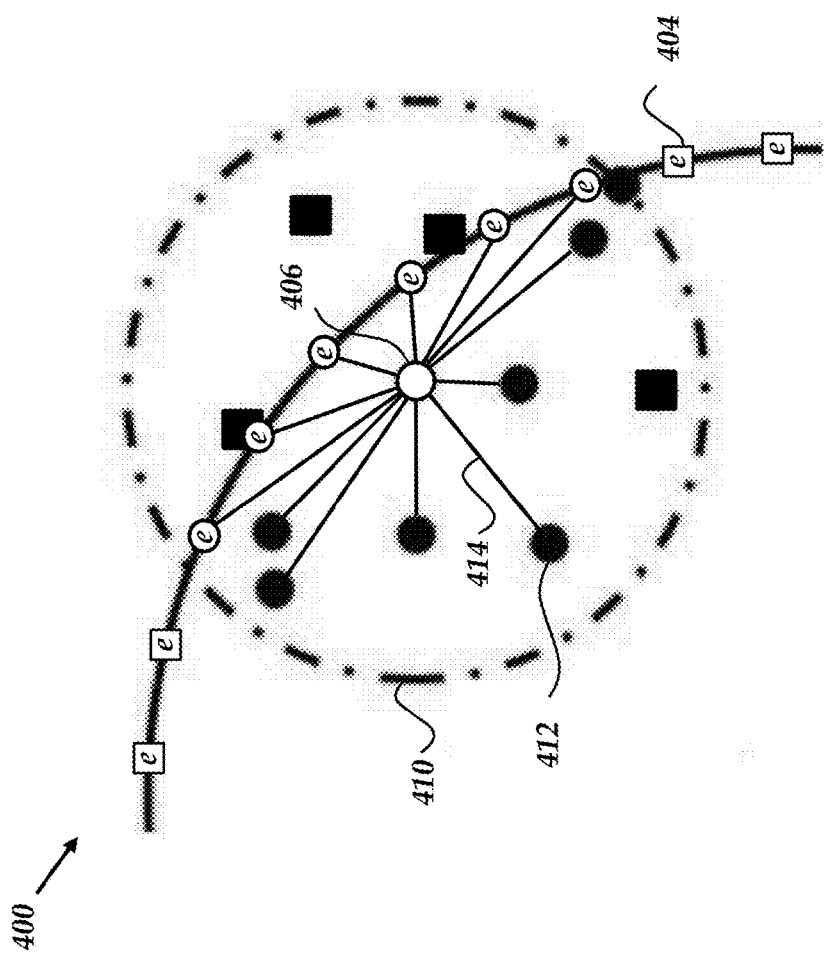
FIG. 4D is a schematic illustration of data interpolated between selected data points of the merged LADAR-edge point cloud of FIG. 4A.

In sub-operation 256, LADAR and edge data points within the search area 410 are identified. For example, the merged LADAR-edge point cloud is queried within the search area 410 and every LADAR data point 402 and edge data point 404 that lies within the search area 410 is identified. The search area 410 and identified data points of FIG. 4B are expanded for clarity in FIGS. 4C-4D. Discrete edge data points 404 are further illustrated. It may be understood that, while FIGS. 4C-4D illustrate only a portion of the LADAR and edge data points, the remaining LADAR data points 402 and edge data points 404 are still present.

In sub-operation 260, each data point identified within the search area 410 is further analyzed to determine whether it is co-planar with the selected data point 406. For example, the upsampling system 102 may query the merged LADAR-edge point cloud for the height of each of the identified points within the search area 410. The upsampling system 102 may further calculate a deviation in height between each of these identified data points and the selected data point 406. Those data points within the search area 410 that exhibit a height deviation less than a selected threshold value are utilized in subsequent interpolation operations, while those data points within the search area 410 that exhibit a height deviation greater than the selected threshold value are ignored in subsequent interpolation operations. For example, with reference to FIGS. 4C-4D, assume that the edge and LADAR data points having a square shape are not co-planar with the selected data point 406, while the data points having a circular shape are co-planar with the selected data point 406.

In an embodiment, the selected threshold distance is generally selected to have a minimum value that exceeds a height measurement error of the imaging device 104. For example, in certain embodiments, the selected threshold value may be less than or equal to about 0.25 meters.

In sub-operation 262, the data points identified within the search area 410 that are also co-planar with the selected data point 406 are employed to generate additional data in conjunction with the selected data point 406. For example, with reference to FIG. 4D, assume data point 412 to be the second selected data point. Interpolated data 414 is generated along a line between data points 406 and 412. For simplicity, the interpolated data 414 is illustrated in FIG. 4D as a line, however, it may be understood that the interpolated data 414 are discrete data points. In certain embodiments, the interpolation may be a linear interpolation using the coordinates of the data points 406 and 412. However, it may be understood that other forms of interpolation may be employed without limit.

The interpolated data 414 may be spaced apart from one another by a defined spacing value. In an embodiment, the defined spacing value may be provided to the upsampling system 102 by the user using his or her user computing device 106. In an alternative embodiment, the defined spacing value may be a default value.

In an embodiment, the defined spacing value is less than an average spacing of adjacent data points of the LADAR point cloud. Examples of the defined spacing value may include, but are not limited to, less than or equal to about 1 meter, less than or equal to about 0.8 meters, less than or equal to about 0.6 meters, less than or equal to about 0.4 meters, less than or equal to about 0.2 meters, less than or equal to about 0.1 meters, less than or equal to about 0.05 meters. In certain embodiments, the defined spacing value may be about 0.25 meters.

After the interpolated data 414 are generated between the data points 406 and 412, operation 262 continues with generation of further interpolated data between the selected data point 406 and each of the remaining co-planar data points within the search area 410, as illustrated in FIG. 4D. Subsequently, operation 210 moves to sub-operation 264.

In sub-operation 264, a determination is made whether select a new data point for use in the upscaling operation 210. If additional data points of the merged LADAR-edge point cloud remain to be upscaled, operation 210 returns to sub-operation 252, where a new data point is selected. If no additional data points of the merged LADAR-edge point cloud remain to be considered, operation 210 continues to sub-operation 266.

An image representative of the merged LADAR-edge point cloud after upscaling is illustrated in FIG. 3E. Significant improvement in the density of the merged LADAR-edge point cloud is apparent, as compared to the image of the original merged LADAR-edge point cloud (FIG. 3D).

It may be observed that the operation 210 generates duplicate interpolated data. For example, assume a first data point is selected and a first set of interpolated data is generated between the first data point and a second data point. Further assume that the second data point is later selected and a second set of interpolated data is generated between the second data point and the first data point. As the coordinates of the first and second data points remain constant, the first and second sets of interpolated data are the same.

However, this duplicate interpolated data is undesirable. For example, redundant data points require additional storage and processing, without any providing an additional benefit. Accordingly, in order to eliminate redundant interpolated data, a filtering operation is performed in operation 266. In an embodiment, the filter is a voxel grid filter that creates a 3D grid of volume elements. While the volume elements may adopt any size and shape, as necessary, a cube-shaped volume element will be assumed for discussion. For each cube, a centroid is calculated from all of the data points (LADAR data 402, edge data 404, and interpolated data points 412). A new data point representing this centroid is added to the merged LADAR-edge point cloud and marked with a mask band. This mask band allows the user to quickly differentiate the original LADAR data points from the interpolated points.

In sub-operation 270, a decision is made whether to repeat sub-operations 252-266 using a smaller search radius. Use of a smaller search radius fills in holes that remain in the upscaled, merged LADAR-edge point cloud after completion of upsampling sub-operations 252-266. In one example, this decision may be made by receiving instructions from the user (e.g., the user examines an image derived from the upscaled, merged LADAR-edge point cloud and provides instructions based upon interpretability). In another example, the decision may be made by the upscaling system (e.g., the upscaling system examines an average density of the upscaled, merged LADAR-edge point cloud). In a further example, this decision may be made based upon the value of the current search radius (e.g., in comparison to a designated search radius). If a decision is made to reduce the search radius, operation 210 returns to sub-operation 252 using the updated search radius. If a decision is made to not reduce the search radius, operation 210 ends and the upsampling process 200 moves to operation 212.

Figure 3G:
FIG. 3G is an image representative of the merged LADAR-edge point cloud of FIG. 3F after an occlusion and fusing operation.
Figure 3F:
FIG. 3F is an image representative of the merged LADAR-edge point cloud of FIG. 3E after an upsampling process using a reduced search radius.

An image representative of the merged LADAR-edge point cloud after upscaling with a reduced search radius is illustrated in FIG. 3F. It may be observed that the density of the upscaled, merged LADAR-edge point cloud in FIG. 3F is significantly increased, as compared to the upscaled, merged LADAR-edge point cloud of FIG. 3E, generated using a larger search radius.

In an embodiment, the updated search radius may be any radius less than the currently employed search radius. Examples of the updated search radius may include, but are not limited to, about 90% of the current search radius, about 80% of the current search radius, about 70% of the current search radius, about 60% of the current search radius, about 50% of the current search radius, about 40% of the current search radius, about 30% of the current search radius, about 20% of the current search radius and about 10% of the current search radius. In certain embodiments, the updated search radius may be about 50% of the current search radius.

It has been observed that the upsampling process 200 may overextend some edges due to RPC error or incorrect edge projection. This overextension causes some roofs to be painted with the wall color. Accordingly, in operation 212, a look angle discrimination is performed, where each point contained within the upscaled, merged LADAR-edge point cloud is examined to determine if it occludes other points. Occluded points are set to 0 (black), while non-occluded points are painted with the pixel value from the photographic image (e.g., FIG. 3B). The pixel value is obtained by projecting the point through the RP. If a data point is determined to be occluded, the point is set to black. All non-occluded points may be painted with the pixel value from the image. The pixel value may be obtained by projecting the data point through the RPC. An image representative of the merged LADAR-edge point cloud after operation 212 is illustrated in FIG. 3G. This fusion has been found to provide the most interpretable result when upsampling has been used to increase the LADAR resolution to the resolution of the photographic image.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

The terms comprise, include, and/or plural forms of each are open ended and include the listed parts and can include additional parts that are not listed. The term and/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A system for upsampling LADAR data, comprising:
    a plurality of electronic data storage devices maintaining
        a merged LADAR-edge point cloud comprising:
        a plurality of LADAR data points, each of the LADAR data points representing a height as a function of a position within an area of interest; and
        a plurality of edge data points, each of the edge data points representing a height as a function of a position for boundaries of objects within the area of interest; and
    one or more processors in communication with the plurality of electronic data storage devices, the one or more processors adapted to:
        select a first LADAR data point from the merged LADAR-edge point cloud, the first LADAR data point including a first height at a first position;
        select a second data point from the merged LADAR-edge point cloud, the second data point including a second height at a second position, wherein the second data point is either a LADAR data point or an edge data point and is selected such that:
            the second position differs from the first position by less than or equal to a first threshold value; and
            the second height differs from the first height by less than or equal to a second threshold value; and
        generate a plurality of upscaled data points, wherein each of the plurality of upscaled data points represents an upscaled height interpolated between the first height and the second height and an upscaled position interpolated between the first position and the second position.

2. The system of claim 1, wherein the one or more processors are further adapted to:
    generate a volume element within a portion of the area of interest;
    determine a centroid position of all data points of the merged LADAR-edge point cloud and the upscaled data points contained within the volume element; and
    generate an aggregate LADAR data point representing an aggregate height based upon each of the heights of data points contained within the volume element and an aggregate position given by the determined centroid position.

3. The system of claim 2, wherein the one or more processors are further adapted to store an upscaled merged LADAR-edge point cloud in the plurality of electronic data storage devices, the upscaled merged LADAR-edge point cloud comprising the merged LADAR-edge point cloud and the aggregate LADAR data point.

4. The system of claim 3, wherein the upscaled merged LADAR-edge point cloud does not include the plurality of upscaled data points.

5. The system of claim 1, wherein the first threshold value is at least 1.5 times a spacing of adjacent scan lines of the plurality of LADAR data points.

6. The system of claim 1, wherein the height of each of the plurality of upscaled data points is given by a linear interpolation between the first height and the second height.

7. The system of claim 1, wherein the position of each of the plurality of upscaled data points is given by a linear interpolation between the first position and the second position.

8. A method of upsampling LADAR data, comprising:
    obtaining, by one or more processors, a merged LADAR-edge point cloud comprising:
        a plurality of LADAR data points, each of the LADAR data points representing a height as a function of a position within an area of interest; and
        a plurality of edge data points, each of the edge data points representing height as a function of a position for boundaries of objects within the area of interest;
    selecting, by the one or more processors, a first LADAR data point from the merged LADAR-edge point cloud, the first LADAR data point including a first height at a first position;
    selecting, by the one or more processors, a second data point from the merged LADAR-edge point cloud, the second data point including a second height at a second position, wherein the second data point is either a LADAR data point or an edge data point and is selected such that:
        the second position differs from the first position by less than or equal to a first threshold value; and
        the second height differs from the first height by less than or equal to a second threshold value; and
    generating, by the one or more processors, a plurality of upscaled data points, wherein each of the plurality of upscaled data points represents an upscaled height interpolated between the first height and the second height and an upscaled position interpolated between the first position and the second position.

9. The method of claim 8, further comprising, by the one or more processors:
    generating a volume element within a portion of the area of interest;
    determining a centroid position of all of the merged LADAR-edge point cloud and the upscaled data points contained within the volume element; and
    generating an aggregate LADAR data point representing an aggregate height based upon each of the heights of the data points contained within the volume element and an aggregate position given by the determined centroid position.

10. The method of claim 8, wherein the one or more processors is further adapted to store an upscaled merged LADAR-edge point cloud in the plurality of electronic data storage devices the upscaled merged LADAR-edge point cloud comprising the merged LADAR-edge point cloud and the aggregate LADAR data point.

11. The method of claim 10, wherein the upscaled merged LADAR-edge point cloud does not include the plurality of upscaled data points.

12. The method of claim 8, wherein the first threshold value is at least 1.5 times a spacing of adjacent scan lines of the plurality of LADAR data points.

13. The method of claim 8, wherein the height of each of the plurality of upscaled data points is given by a linear interpolation between the first height and the second height.

14. The system of claim 8, wherein the position of each of the plurality of upscaled data points is given by a linear interpolation between the first position and the second position.

15. A non-transitory, computer-readable medium having computer-readable program codes embedded thereon for upsampling LADAR data, the computer-readable program codes including instructions that, when executed by one or more processors, cause the one or more processors to:
    obtain a merged LADAR-edge point cloud comprising:
        a plurality of LADAR data points, each of the LADAR data points representing a height as a function of a position within an area of interest; and
        a plurality of edge data points, each of the edge data points representing height as a function of position for boundaries of objects within the area of interest;
    select a first LADAR data point from the merged LADAR-edge point cloud, the first LADAR data point representing a first height at a first position;
    select a second data point from the merged LADAR-edge point cloud, the second data point representing a second height at a second position;
    wherein the second data point is either a LADAR data point or an edge point and is selected such that:
        the second position differs from the first position by less than or equal to a first threshold value;
        the second height differs from the first height by less than or equal to a second threshold value; and
    generate a plurality of upscaled data points, wherein each of the plurality of upscaled data points represents an upscaled height interpolated between the first height and the second height and an upscaled position interpolated between the first position and the second position.

16. The computer-readable medium of claim 15, further including instructions that, when executed, cause the one or more processors to:
    generate a volume element within a portion of the area of interest;
    determine a centroid position of all of the merged LADAR-edge point cloud and the upscaled data points contained within the volume element; and
    generate an aggregate LADAR data point representing an aggregate height based upon each of the heights of the data points contained within the volume element and an aggregate position given by the determined centroid position.

17. The computer-readable medium of claim 15, further including instructions that, when executed by the one or more processors, cause the one or more processors to store an upscaled merged LADAR-edge point cloud in the plurality of electronic data storage devices, the upscaled merged LADAR-edge point cloud comprising the merged LADAR-edge point cloud and the aggregate LADAR data point.

18. The computer-readable medium of claim 17, wherein the upscaled merged LADAR-edge point cloud does not include the plurality of upscaled data points.

19. The computer-readable medium of claim 15, wherein the first threshold spacing is at least 1.5 times a spacing of adjacent scan lines of the plurality of LADAR data points.

20. The computer-readable medium of claim 15, wherein the height of each of the plurality of upscaled data points is given by a linear interpolation between the first height and the second height.

21. The computer-readable medium of claim 15, wherein the position of each of the plurality of upscaled data points is given by a linear interpolation between the first position and the second position.

* * * * *